Sept. 16, 1969

A. WHARTON 3,466,959

WEB MATERIAL HANDLING APPARATUS

Filed Aug. 30, 1967

INVENTOR.
ARMISTEAD WHARTON

BY Melvin A. Klein

ATTORNEYS

INVENTOR.
ARMISTEAD WHARTON
BY Melvin A. Klein
ATTORNEYS

United States Patent Office 3,466,959
Patented Sept. 16, 1969

3,466,959
WEB MATERIAL HANDLING APPARATUS
Armistead Wharton, Henrietta, N.Y., assignor to Xerox Corporation, Rochester, N.Y., a corporation of New York
Filed Aug. 30, 1967, Ser. No. 664,474
Int. Cl. B26d 5/20
U.S. Cl. 83—205                                    4 Claims

ABSTRACT OF THE DISCLOSURE

A web material feeding and cutting apparatus in which a closed-loop mechanical system responds to a mechanical pulse or signal to operate one cycle of metering and cutting by the interaction of clutching and camming mechanisms and to stop without further signals or external control. An adjustable mechanism is provided for controlling the length of web material cut.

---

This invention relates to apparatus for feeding and cutting a roll of web material into strips of a predetermined length.

Various devices are known in the prior art for feeding and cutting web material. Normally these devices involve complex mechanisms in which time related signals are used to actuate first feeding and metering components and then a cutting component to sever a sheet from its roll.

It is desirable to have the metering and cutting functions performed as rapidly as possible without sacrificing accuracy in the length of sheet cut. While the existing feeding and cutting mechanisms are satisfactory in one sense, there is still need for a device which can accomplish these functions simply and efficiently.

An object of this invention is to improve devices for feeding and cutting web material.

Another object of this invention is to integrate metering, feeding and cutting mechanisms in a simplified mechanical unit or module.

Another object of this invention is to improve web material feeding and cutting apparatus having adjustable means for controlling the length of the cut sheet.

Another object of this invention is to provide a closed-loop mechanical system for web material feeding and cutting apparatus so as to enable a single mechanical pulse or signal to operate one cycle of metering and cutting without further signals or external control.

Another object of this invention is to improve the efficiency and service life of web material feeding and cutting apparatus.

Further objects and features of the invention will become apparent on reading the following description in connection with the drawings wherein.

Figure 1:
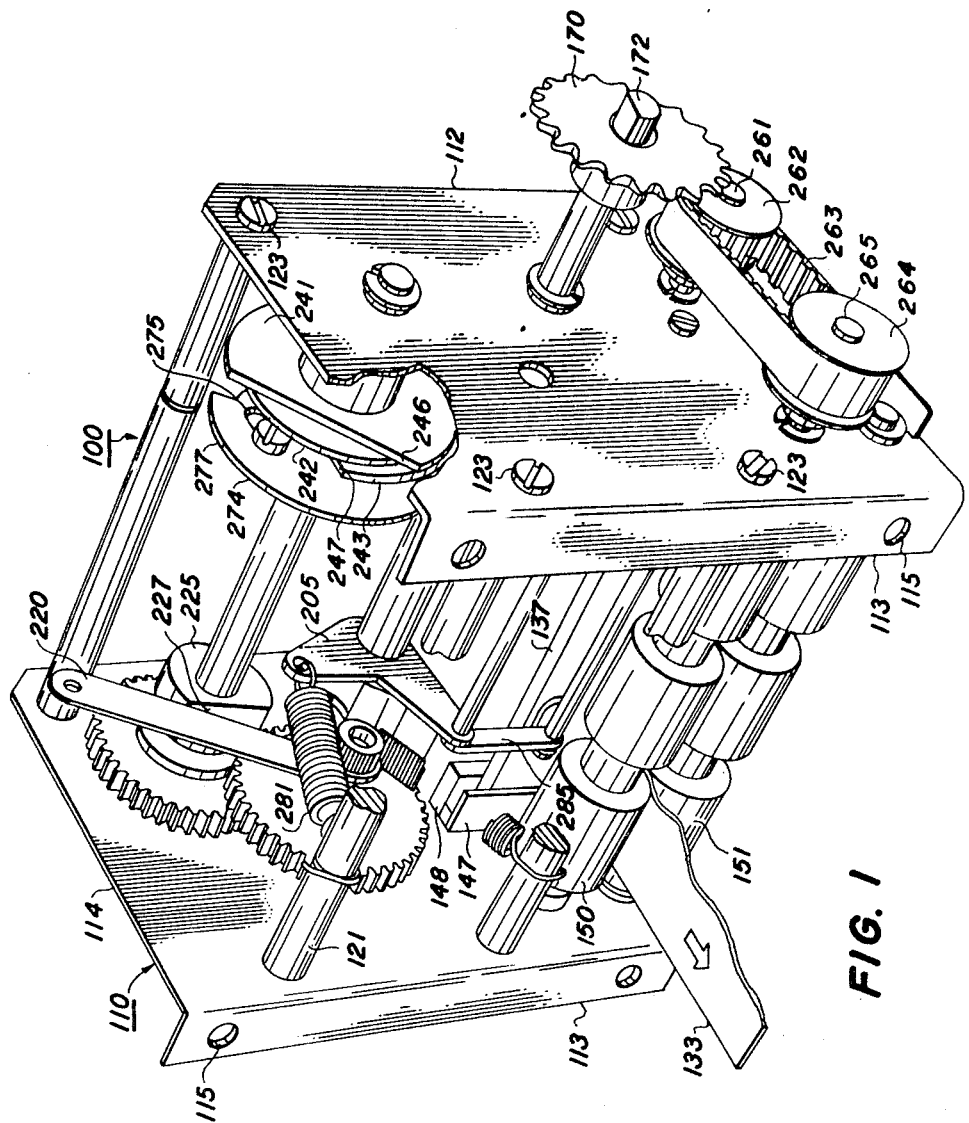
FIGS. 1 and 2 are right-hand and left-hand perspective views, respectively, of web material feeding and cutting apparatus according to the present invention.
Figure 2:
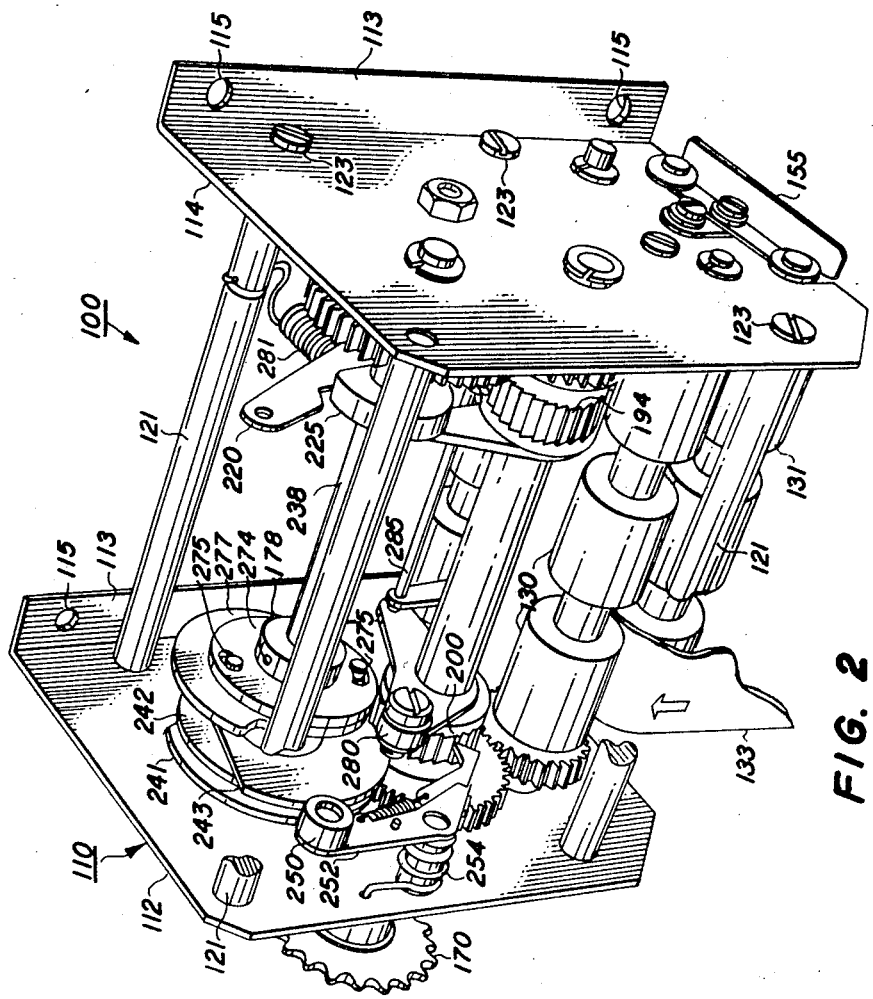
Figure 3:
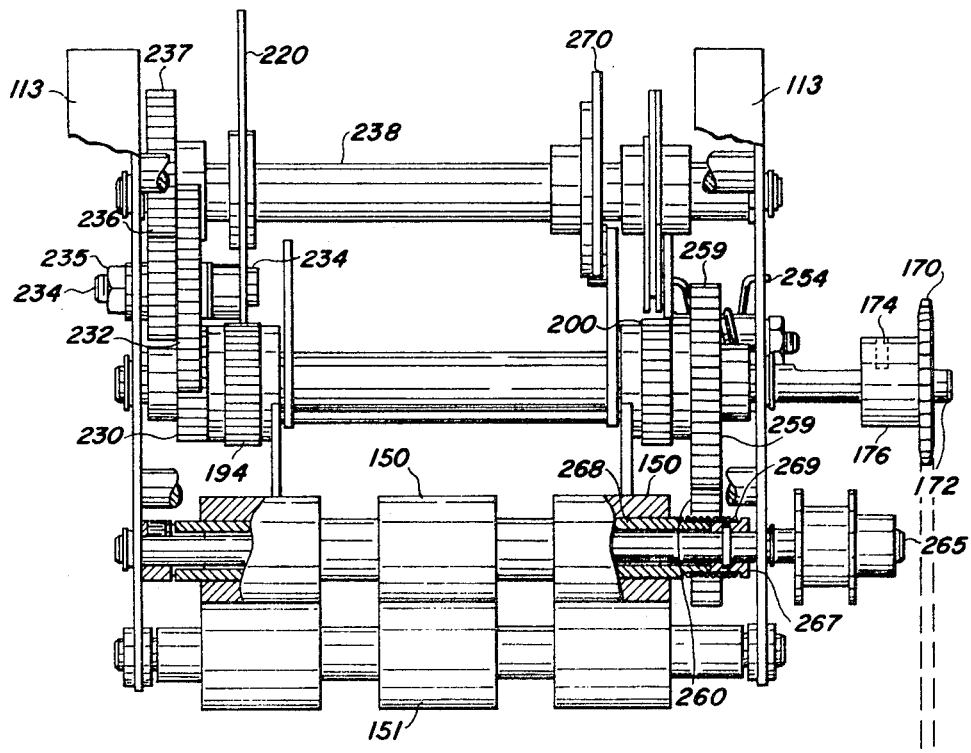
FIG. 3 is an end view of the web material feeding and cutting apparatus.
Figure 6:
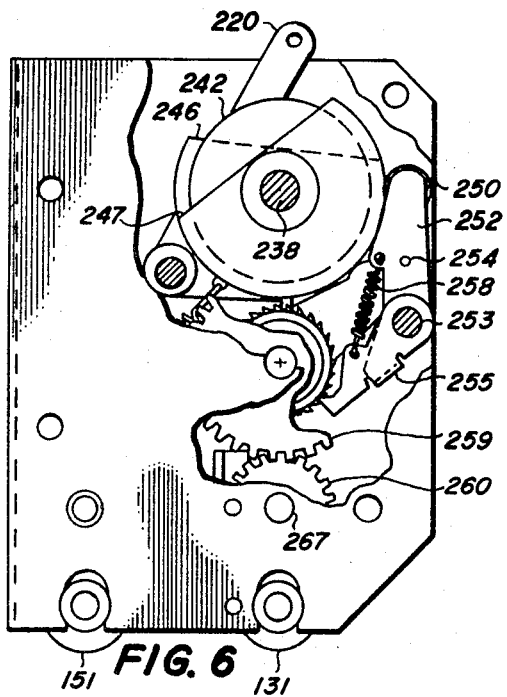
FIGS. 4, 5, 6 and 7 are side views of the web material feeding and cutting apparatus with parts in section to illustrate details therein.
Figure 7:
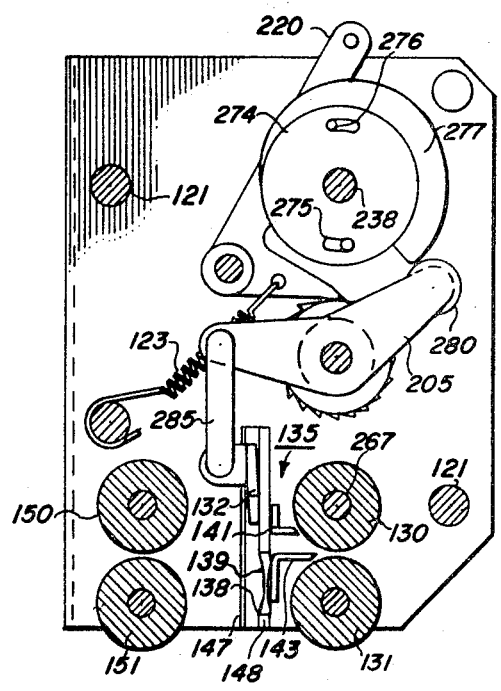
Figure 4:
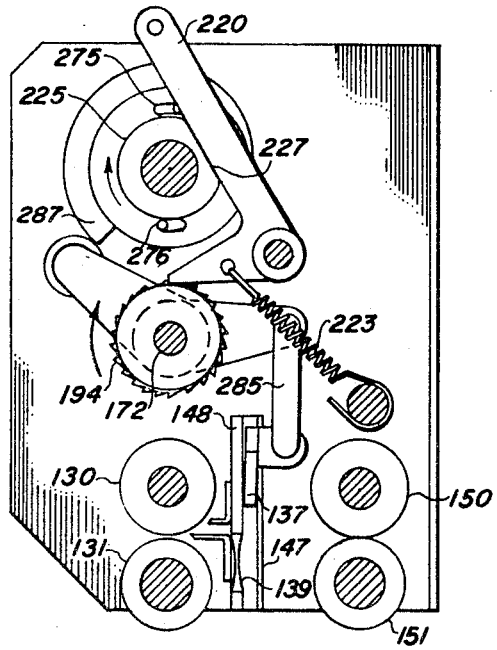
Figure 5:
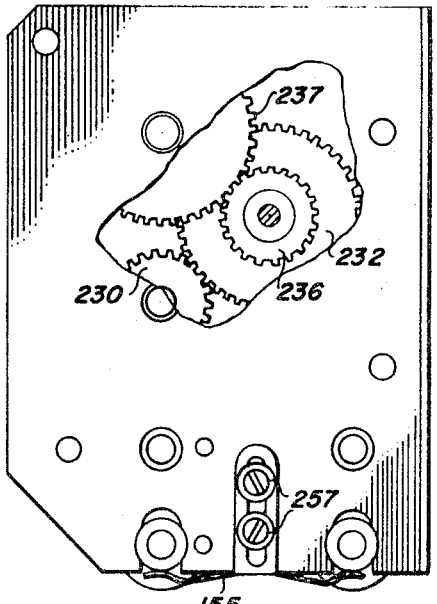
Figure 8:
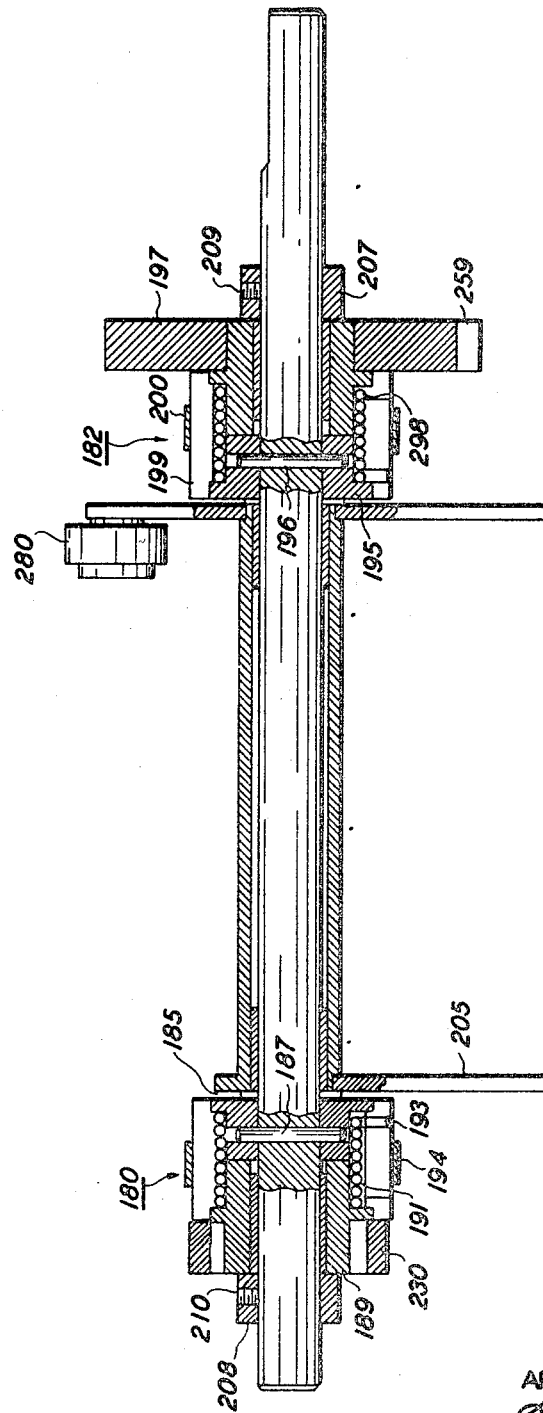
FIG. 8 is a sectional view of the drive and clutching mechanisms of the web material feeding and cutting apparatus.

Referring now to FIGS. 1–8, in which like reference numerals refer to the same parts, there is shown a web material feeding and cutting assembly 100 constructed in accordance with the invention. Feeding and cutting assembly 100 comprises a frame 110 consisting of spaced plates 112 and 114 which have flanged portions 113 with apertures 115 formed therein suitable for mounting the assembly. Joining the plates 112 and 114 to form a rigid structure are tie rods 121 which are suitably secured to the plates by screws 123. On the lower portion of the frame 110 is a set of metering rolls 130, 131 which serves to meter web material 133 as will be explained hereinafter. Web material 133 may be in the form of a roll which is supported at any convenient location and guided into feeding and cutting assembly 100 in the direction indicated by the arrows.

In line with the nip of metering rolls 130, 131 is a cutter mechanism 135 of the guillotine type which comprises a movable blade 137 and a fixed blade 138. A pair of guide elements 141, 143 serves to guide the web between the blades where it is cut accurately and swiftly by imparting a powerful mechanical force about a pivot to movable blade 137 as will be explained more fully hereinafter. Movable blade 137 is loosely guided in a downward direction on the cutting stroke by a pair of spaced plates 147, 148. It will be noted that there is sufficient spacing between plates 147, 148 to accommodate a slight twisting movement to be made on movable blade 137. Fixed blade 138 is arranged with hollowed sides 139 so that as the cutting edge of blade 137 contacts the adjacent cutting edge of fixed blade 138, a sharp and clean cut is made to sever the web material accurately along its entire width. It should be noted that blades 137, 138 are arranged symmetrically to afford a plurality of cutting edges which may be changed around periodically as desired.

A pair of exit drive rolls 150, 151 is positioned on the side of blades 137, 138 opposite from metering rolls 130, 131 to facilitate transport of the web material into and out of the cutting position. Drive rolls 150, 151 move only at the same time as metering rolls 130, 131 so that there is no movement of the web material at the time of cut. It will be observed that drive roll 150 has a clutch overdrive for permitting withdrawal of a cut sheet.

Upper or drive rolls 130 and 150 take the form of cylindrical segments desirably made of friction generating material, such as, rubber. Lower or idler rolls 131, 151, which are also arranged in cylindrical segments, are made of any suitable material. Idler rolls 131, 151 are urged into elastic contact with their corresponding drive rolls by leaf springs 155 which are clamped to frame 110 by screws 157.

The metering and cutting action of web material feeding and cutting assembly 100 is tied to a closed-loop mechanical system which has a reliable mechanical timing and actuating mechanism tied together into a compact modular unit. The drive mechanism comprises a continuously running sprocket member 170 which is driven by a drive 171. Sprocket member 170 is fixed to a drive shaft 172 by means of a set screw 174 received in a collar portion 176 of the sprocket member. Drive shaft 172 has mounted thereon a pair of clutch assemblies 180 and 182. Clutch assembly 180 comprises a driven collar member 185 which is secured to the drive shaft by a pin 187 and a driven collar member 189. A spring member 191 is wound around drive collar member 185 and driven collar member 189 in such a manner that as the spring contracts drive motion is imparted to driven collar member 189, but when the spring is expanded, no motion is imparted. A movable control ring 193 having ratchet teeth 194 formed therein engages one end of spring 191 causing the spring to expand when a finger 220 engages the ratchet teeth. On the other hand when the ratchet teeth are disengaged the spring is allowed to contract around driven collar member 189 imparting movement to it. In similar fashion, clutch assembly 182 has a driven collar member 195 secured to the drive shaft by a pin 196 and a driven collar member 187 with a spring 198 wound therearound, and a control ring 199 with ratchet teeth 200 formed therein. Also mounted on the drive shaft is a rocker arm assembly 205 which actuates movable blade 137 of the cutter mechanism as will become more apparent. A pair of collars 207, 208 take up lost motion in an axial direction of the clutch assemblies and rocker arm 205 on drive shaft 172 and are secured to the shaft by means of set screws 209 and 210, respectively.

To start the cutting and metering cycle, finger 220 is moved about its pivot, thereby retracting the end of the finger from ratchet teeth 194. When ratchet teeth 194 are disengaged, spring 191 is able to contact allowing rotary movement to be imparted to driven collar member 189. Driven collar member 189 of clutch assembly 180 is integral with a gear 230 which meshes with a gear 232 rotatably mounted on an idler shaft 234 secured to plate 112 by a nut 235. A gear 236 which is integral and concentric with gear 232 meshes with a gear 237 to drive a cam shaft 238. As movement is imparted by cam shaft 238, cam element 225 holds finger 220 disengaged from ratchet teeth 194 until a flattened portion 227 thereon completes a revolution and allows spring 223 to urge finger 220 into engagement with the ratchet teeth.

Mounted on the cam shaft 238 is a group of metering cam elements 241, 242 and 243. Cam elements 241 and 243 have flattened potrions 246, 247, respectively. These cam elements are rotatable on the cam shaft to effect an adjustable camming surface together with circular cam element 242. It will be observed that cam element 242 has a slightly smaller diameter than cam elements 241, 243 and is intended for use as a spacer between cam elements 241, 243. In engagement with the cam elements is a roller 250 which is rotatably journaled on an arm member 252 which is on a pin 253 fixed to plate 212. Cam follower 250 is held in firm contact with cam elements 241, 242, 243 during the rotation of the drive shaft by a torsion spring 254 which is connected at one end to arm member 252 and at the other end to plate 112. Also pivotable on pin 253 is a finger 255 which is elastically connected to arm member 252 by a spring 258 which causes finger 255 to follow the motion of arm member 252. Since finger 255 under the control of cam elements 241 and 243 is either engaged or disengaged from ratchet teeth 200 of clutch assembly 182, the length of paper metered in controlled by the angular position of cam elements 241, 243. It should be understood that while these cam elements are manually positionable on cam shaft 238, it is contemplated that this operation could be performed automatically.

As cam follower 250 rides along cam elements 241, 243, a pivot movement will be imparted to arm member 252 and finger 255 when roller 250 reaches the low rise profile formed by flattened portions 246, 247 of cam elements 241, 243, respectively. When thi soccurs, drive shaft 172 drives driven collar member 197, which is fixed to gear 259 which in turn drives gear 260 mounted on shaft 265 on which exit drive roll 150 is mounted. It will now be appreciated that it is possible to accurately control the degrees of rotation in which the metering and drive rolls are driven and consequently meter the length of paper which is to be cut.

To enable a cut sheet to be withdrawn from exit rolls 150, 151, a clutch assembly similar to clutch assemblies 180, 182 is mounted on shaft 265. This clutch assembly comprises a drive collar member 267, a driven core member 268, and control spring 269. It will be observed that when a cut sheet is withdrawn from exit rolls 150, 151 that spring 269 is expanded thereby declutching core member 268 from its associated drive.

At the start of the cycle movable blade 137 is in the down or rest position. In order to raise blade 137 for the cutting operation, there is mounted on the cam shaft 238 a disc 274 having slots 275 formed therein which receive pins 276 mounted on a loosely fitting cam 277. Disc 274 is fixed to the cam shaft by a set screw 278 and imparts rotary movement to the cam 277. Cam 277 is engaged by a roller 280 which is rotatably journaled on rocker arm 205 which is connected to the movable blade element 137 by a linkage 285. At the start of the cycle roller 280 contacts the low portion of cam 277. As cam shaft 238 rotates, roller 280 is urged outwardly extending spring 281 thereby storing energy at a very slow rate in the spring. When disc 274 passes the high portion of cam 277 it is pushed ahead in a counterclockwise direction through the lost motion allowed by pins 276 and slots 275 causing rocker arm 205 to move rapidly in a counterclockwise direction due to the strong pull of spring 281. With the cam 277 moved out of the way, roller 280 is now pulled inwardly offering no interference with the spring 281 to thereby release the energy stored therein. Since rocker arm 205 is connected to blade 137 by link 285, blade 137 will be driven downwardly with a swift and powerful force to perform the cutting of the web.

As the cam shaft 238 continues to rotate, finger 220 comes to rest against the flattened portion 227 of cam 225 thereby allowing finger 220 to be drawn into contact with ratchet teeth 194 declutching the cam shaft from the drive shaft movement. The web material feeding and cutting assembly is now ready for the start of another cycle in which web material is metered and cut in the same manner as described.

As is apparent from the above description, with the structure of the invention an exceedingly reliable and compact assembly is provided for feeding and cutting web material. Due to the fact that the metering and cutting functions are accomplished in a closed-loop mechanical system, a single mechanical pulse or signal enables an entire cycle of metering and cutting without further signals or external control. Moreover, on account of the twisting action of the moving blade contacting a fixed blade with a unique hollowed shape, the cut is extremely clean and accurate obviating any waste of web material.

While the invention has been described with reference to the structure disclosed herein, it is not to be confined to the specific details set forth.

What is claimed is:

1. Apparatus for feeding and cutting web material comprising means for advancing web material along a predetermined path, cutting means disposed in the web path including a movable blade and a fixed blade, biasing means for urging said movable blade into a rest position contacting said fixed blade, first shaft means adapted for continuous driving operatively associated with a second shaft means through a first normally open clutch means, first actuating means for engaging said first clutch means for the duration of one complete revolution thereof, first camming means carried on said second shaft means, second normally open clutch means between said web material advancing means and said first shaft means, second actuating means for engaging said second normally open clutch means for a predetermined interval according to the profile of said first camming means, second camming means carried on said second shaft means, rocker means pivotally mounted on said first shaft means engaging said second camming means, said rocker means being connecting to said movable blade by a linkage to cause said movable blade to be moved into a cutting position against the action of said biasing means thereby storing energy in said biasing means, said second camming means being arranged with a low rise portion and a fast drop portion to enable said biasing means to swiftly rock said rocker means about its pivot axis causing said movable blade to contact said fixed blade thereby severing the web material.

2. Apparatus according to claim 1 wherein said first camming means comprises a plurality of cam elements settable at different positions to change the profile thereof thereby enabling the length of sheeting severed from said roll to be varied according to a predetermined setting.

3. Apparatus according to claim 1 wherein said second camming means includes a disc element fixed to said second shaft means, said disc element having slots formed therein, a cam element rotatable on the axis of said second shaft means being positioned to engage said rocker means, said cam element having a plurality of pins arranged to be received in said slots thereby enabling said cam element to be moved relative to said disc element whereby said movable blade can move unobstructed in its cutting path.

4. Apparatus according to claim 1 wherein said fixed blade is shaped to define a hollowed surface for receiving said movable blade in its cutting path.

References Cited
UNITED STATES PATENTS

| | | | |
|---|---|---|---|
| 1,153,346 | 9/1915 | Seator | 83—241 X |
| 1,843,161 | 2/1932 | Ingram | 83—223 X |
| 2,622,681 | 12/1952 | Durst | 83—241 X |

ANDREW R. JUHASZ, Primary Examiner

JAMES F. COAN, Assistant Examiner

U.S. Cl. X.R

83—223, 246